United States Patent
Robinson

(10) Patent No.: US 6,173,973 B1
(45) Date of Patent: Jan. 16, 2001

(54) FORESTRY MACHINE SWING-HOUSE LEVELING MECHANISM

(75) Inventor: Terrence Robinson, Harley (CA)

(73) Assignee: Timberjack Inc., Devonshire (CA)

( * ) Notice: Under 35 U.S.C. 154(b), the term of this patent shall be extended for 0 days.

(21) Appl. No.: 09/332,292

(22) Filed: Jun. 11, 1999

Related U.S. Application Data

(60) Provisional application No. 60/092,207, filed on Jul. 9, 1998.

(51) Int. Cl.[7] .......... A01G 23/081; B60G 17/00; B62D 55/084
(52) U.S. Cl. .......... 280/6.154; 180/41; 144/4.1; 144/34.1; 414/687
(58) Field of Search .......... 280/6.154; 180/41, 180/9.52, 89.15; 144/4.1, 34.1, 34.5, 34.6; 414/687

(56) References Cited

U.S. PATENT DOCUMENTS

| | | |
|---|---|---|
| 2,227,762 | 1/1941 | Ronning . |
| 2,523,734 | 9/1950 | Stephenson et al. . |
| 3,184,867 | 5/1965 | Symmank . |
| 3,218,015 | 11/1965 | Baer . |
| 3,233,909 | 2/1966 | Boone . |
| 3,527,435 | 9/1970 | Lapp et al. . |
| 3,658,146 * | 4/1972 | Trivero .................. 180/41 |
| 3,658,286 | 4/1972 | Terai et al. . |
| 3,670,834 | 6/1972 | Rogers . |
| 3,689,090 | 9/1972 | Dunaevsky et al. . |
| 4,256,279 | 3/1981 | Duel . |
| 4,326,571 | 4/1982 | Crawford ............... 144/34.5 |
| 4,565,486 | 1/1986 | Crawford et al. ........ 144/4.1 |
| 4,650,017 | 3/1987 | Pelletier et al. ......... 180/41 |
| 4,679,803 | 7/1987 | Biller et al. .......... 280/6.154 |
| 4,708,577 | 11/1987 | Fratzke . |
| 4,763,742 | 8/1988 | Langford ............... 180/41 |
| 4,800,936 | 1/1989 | Pomies et al. ......... 144/4.1 |

OTHER PUBLICATIONS

"New FBs Madill Launches 2200s at Forest Expo" by Jim Stirling, *Logging & Sawmilling Journal*; Apr. 1998; pp. 89–90.

\* cited by examiner

*Primary Examiner*—Peter C. English
(74) *Attorney, Agent, or Firm*—Quarles & Brady LLP

(57) ABSTRACT

A swing-to-tree feller buncher has its boom swing-house assembly adjustably supported from its track carriage frame by a leveling mechanism which includes a front link, a rear link, and a pair of laterally spaced apart hydraulic cylinders. Both links are fixed to the frame toward the front of the carriage and the front link is shorter than the rear link. The upper ends of the hydraulic cylinders connect to the turntable support of the swing-house assembly at a position forward of the rear link and extend rearwardly to connect at their lower ends to the frame of the carriage at a position which is rearward of the rear link. The turntable support is also pivotable from side to side relative to the carriage about a minor axis. Simultaneous extensions and retractions of the cylinders cause the turntable support to move and tilt longitudinally, about a lateral axis relative to the carriage, and differential extensions of the cylinders cause the turntable support to tilt sideways about a minor, generally longitudinal, axis of the turntable support. The swing-house assembly can also be tilted rearward so as to reduce the overall height of the machine and enable leveling on a downhill slope.

12 Claims, 7 Drawing Sheets

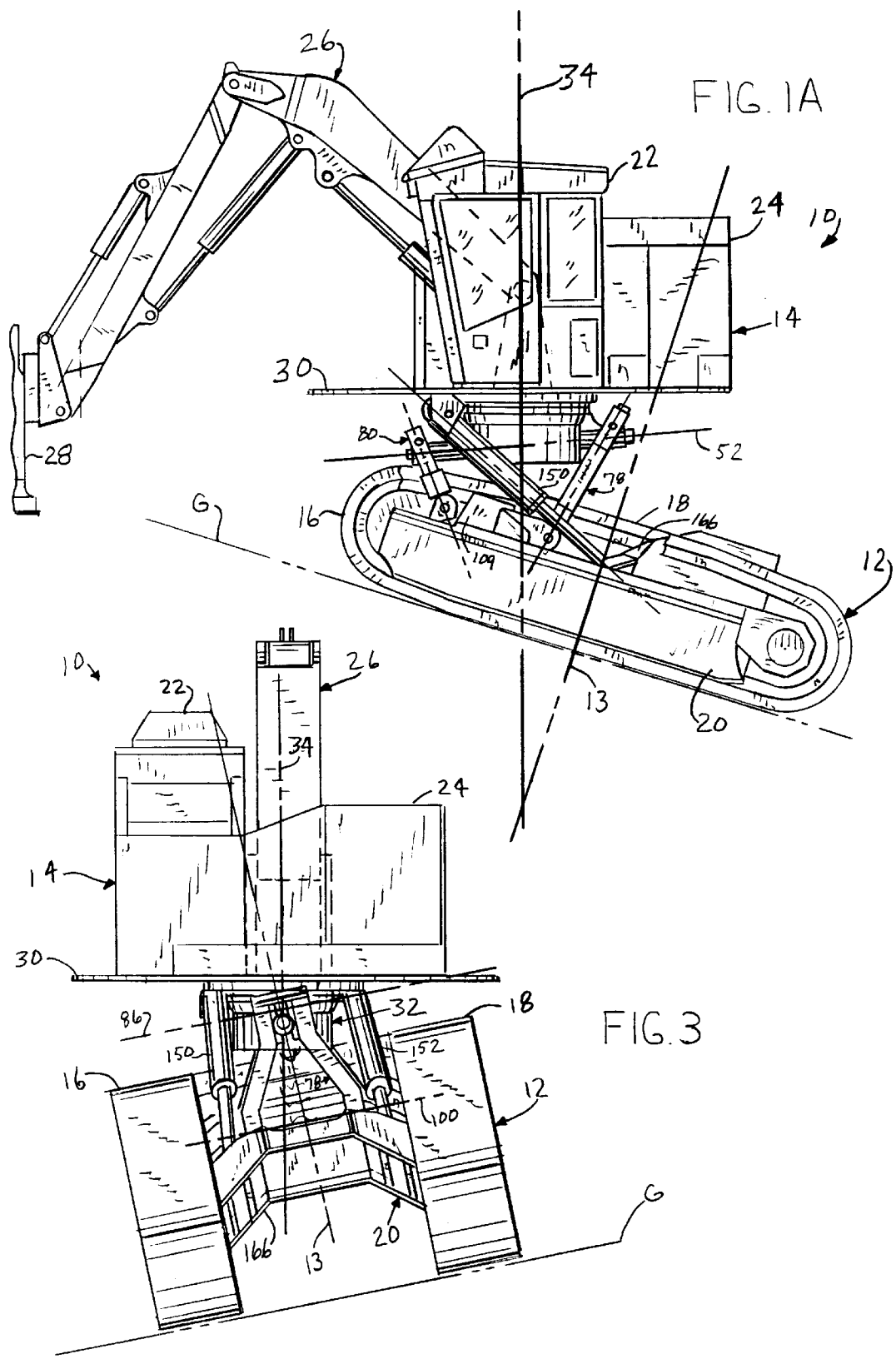

FORESTRY MACHINE SWING-HOUSE LEVELING MECHANISM

CROSS REFERENCE TO RELATED APPLICATION

This claims the benefit of U.S. Provisional Patent Application No. 60/092,207 filed Jul. 9, 1998.

STATEMENT REGARDING FEDERALLY SPONSORED RESEARCH OR DEVELOPMENT

Not applicable.

BACKGROUND OF THE INVENTION

1. Field of the Invention

This invention relates to a mechanism that connects a boom swing-house of a forestry machine to the frame of the ground engaging carriage of the machine, and more particularly to such a mechanism which is operated so as to level the swing-house in uneven or sloping terrain.

2. Discussion of the Prior Art

Forestry machines, such as feller bunchers for harvesting standing trees, are well known. In one type of feller buncher, a saw head which is used to sever the tree is mounted at the end of a boom which has its other end mounted to a turntable so as to be pivotable about a lateral axis relative to the turntable. The turntable is mounted to a turntable support so as to be pivotable about a vertical axis (when the support is vertical). A carriage which can have tracks or wheels for conveying the turntable support has a frame to which the turntable support is mounted by a leveling mechanism. The leveling mechanism is operable to vary the position and orientation of the turntable support relative to the carriage, depending upon the slope of the terrain and the orientation of the carriage on the terrain. For example, if trees are being cut on a hillside, the machine will typically be driven onto the hillside so the trees are within reach of the boom and the leveling mechanism adjusted so as to make the axis of the turntable generally vertical. The center of gravity of the swing-house assembly, which includes the boom (with cutting head attached), the engine of the machine and the operator cab, which are mounted on the turntable, should be positioned relative to the carriage so that the machine does not tip forward or backward when the tree is cut and its weight comes to rest on the butt plate of the head.

Such a mechanism may be made using linkages and hydraulic cylinders for moving the linkages as described in U.S. Pat. No. 4,679,803. In that mechanism, one set of links is provided forwardly and another set is provided rearwardly, and hydraulic cylinders connect the links both laterally and longitudinally to tilt the turntable relative to the carriage both about a lateral axis and a longitudinal axis. Other mechanisms for positioning and orienting the swing-house assembly relative to the carriage are also discussed in U.S. Pat. No. 4,679,803.

Another consideration in a forestry machine is machine height. This is important because these machines are oftentimes transported over the road. If the machine is too high in its shipping position, it will not make it under bridges or other underpasses, or may otherwise exceed the legal height limit of the road. Thus, the need for a leveling mechanism, which adds to the height of the machine, competes against providing a machine which can be transported over the road.

SUMMARY OF THE INVENTION

The invention provides a feller buncher with a leveling mechanism which can be operated over a broad angle range on both sides of a parallel position in which the turntable major axis is parallel to the carriage axis. In addition, a leveling mechanism of the invention does not sacrifice ground clearance of the carriage to provide a lower minimum height of the feller buncher.

The invention accomplishes this by providing two pivotal links for connecting the turntable support to the frame of the carriage but provides that one link is shorter than the other. Preferably, both links are connected to the carriage closer to one end than to the other, and the link closest to the one end is shorter than the other link. This arrangement permits rotating the turntable forwardly about a lateral axis relative to the carriage to a relatively high angle. In this position, since the turntable is rotatable relative to the turntable support about the turntable axis by 360°, the boom of the machine can be operated in front of the carriage, in back of the carriage, or to either side at any angular position.

When cutting or otherwise processing a tree uphill from the machine, the boom with attached feller buncher head or other implement is positioned either in front of or behind the carriage. When processing a tree downhill from the machine, in order to maintain a favorable position of the center of gravity of the machine which resists tipping of the machine downhill, the front of the machine is pointed uphill and the turntable is preferably tilted forwardly, so that its axis, which is ordinarily adjusted to be approximately vertical, is directed uphill of the carriage axis.

This construction also permits tilting the turntable support rearwardly, which serves to lower the transport height of the machine.

In another preferred aspect, a pair of hydraulic cylinders are provided for adjusting the position of the turntable support relative to the carriage. The cylinders extend between the turntable support and the frame of the carriage. The lower ends of the cylinders are pivotally connected to the frame rearward of the lower ends of both links, and the upper ends of the cylinders are laterally spaced apart on opposite sides of the center of the turntable and forwardly of the rearward link. Simultaneous and equal changes in length of the cylinders result in rotating the turntable about a lateral axis. Differential changes in length of the two cylinders result in rotating the turntable about a turntable minor axis to tilt the turntable support about a generally longitudinal axis. Thereby, the pair of hydraulic cylinders can be used to pivot the swing-house assembly forwardly and rearwardly from the parallel position and also to tilt the swing-house assembly from side to side.

Other objects and advantages of the invention will be apparent from the detailed description and drawings.

BRIEF DESCRIPTION OF THE DRAWINGS

FIG. 1A is a side elevation view of a swing-to-tree feller buncher illustrated on a slope, with the swing-house assembly tilted forwardly, the cutting head drawn in phantom and a portion of the track broken away;

FIG. 3 is a rear elevation view of the feller buncher illustrated with the boom in front of the machine and with the swing-house assembly tilted to the right side;

DETAILED DESCRIPTION OF THE PREFERRED EMBODIMENT

Figure 1B:
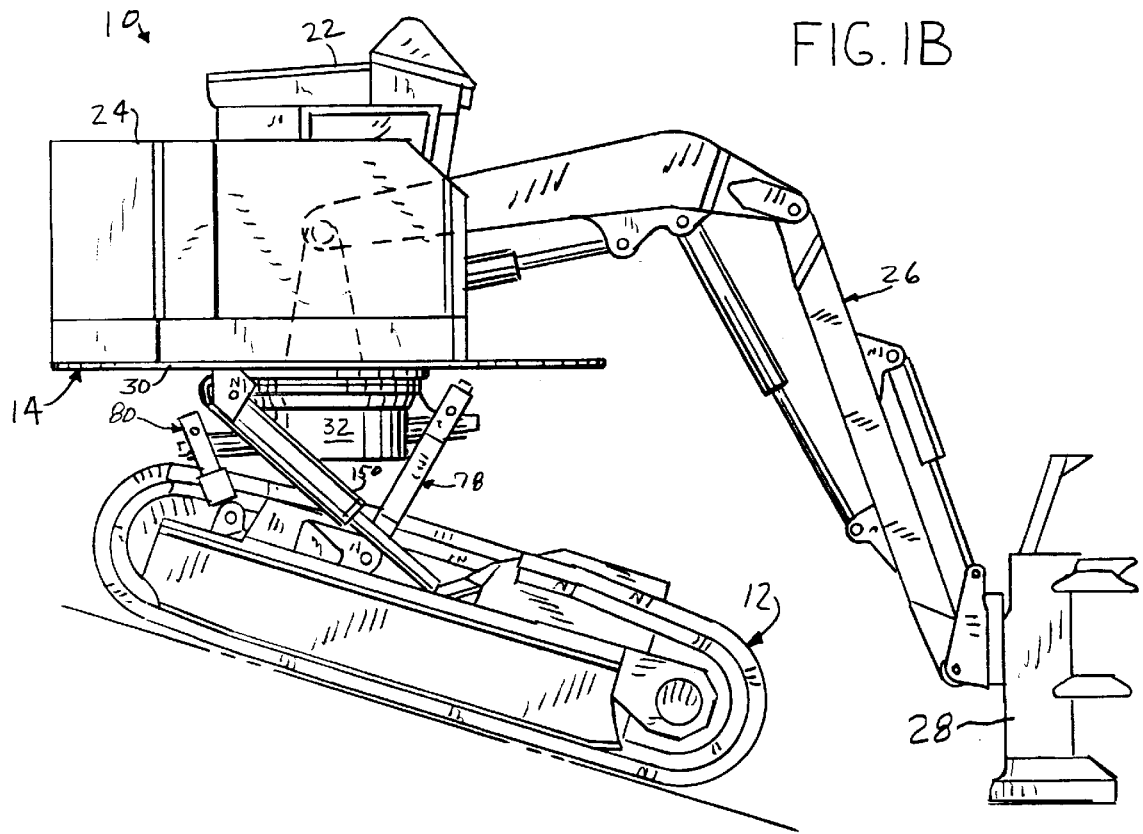
FIG. 1B is a view similar to FIG. 1A, but with the swing-house assembly rotated 180°, so as to be in position to cut a tree downhill from the machine.
Figure 4:
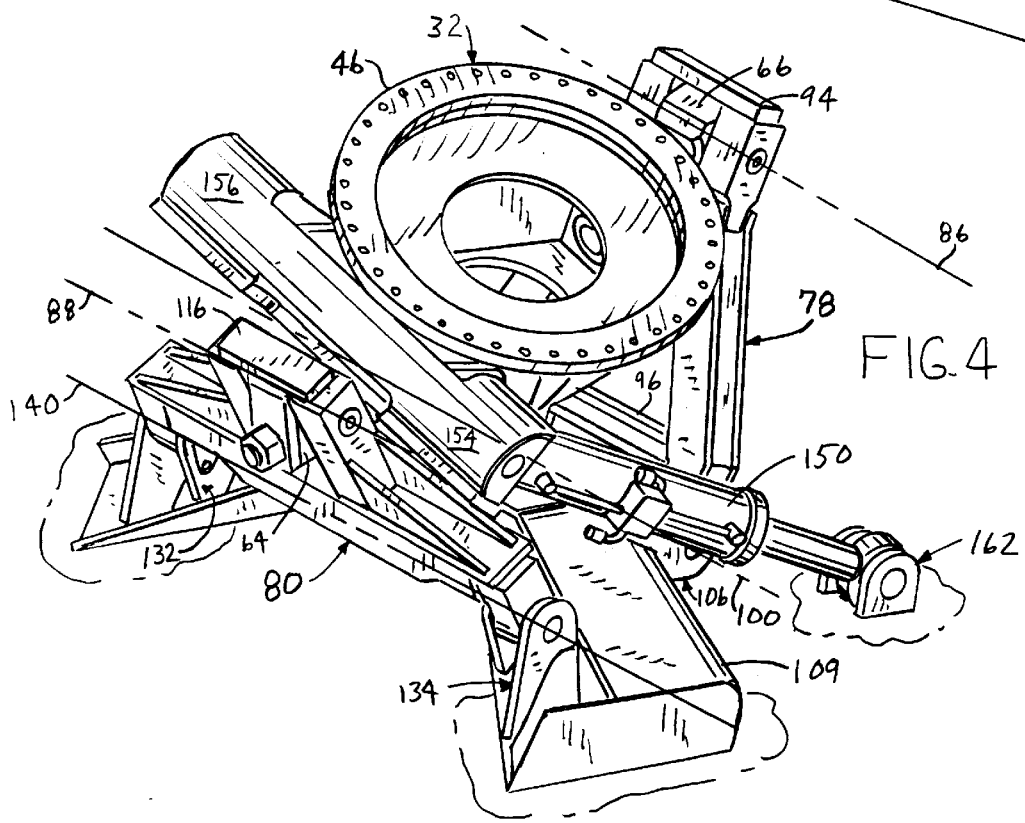
FIG. 4 is a fragmentary perspective view of a leveling mechanism for the machines of FIGS. 1–3 of the invention.

FIG. 1A illustrates a swing-to-tree forestry machine 10, particularly a feller buncher, which includes a carriage 12 and a swing-house assembly 14. The carriage 12 includes tracks 16 and 18 which engage the ground G and are mounted to a carriage frame 20 so as to propel the vehicle 10 when they are driven. The drive mechanism of the tracks 16 and 18 and general structure of the frame 20 are conventional, may be of any suitable type and are not discussed in detail here.

The swing-house assembly 14 includes a cab 22 in which the vehicle operator sits and controls the vehicle, an engine 24 which provides power for driving the carriage and the hydraulic systems of the vehicle 10, and a boom 26, all of which are mounted to a turntable 30. At the end of the boom opposite from the cab 22, a cutting head 28 is mounted for severing a tree to be cut. Many different types of cutting heads are available, a high speed disc saw felling head being illustrated.

Figure 11:
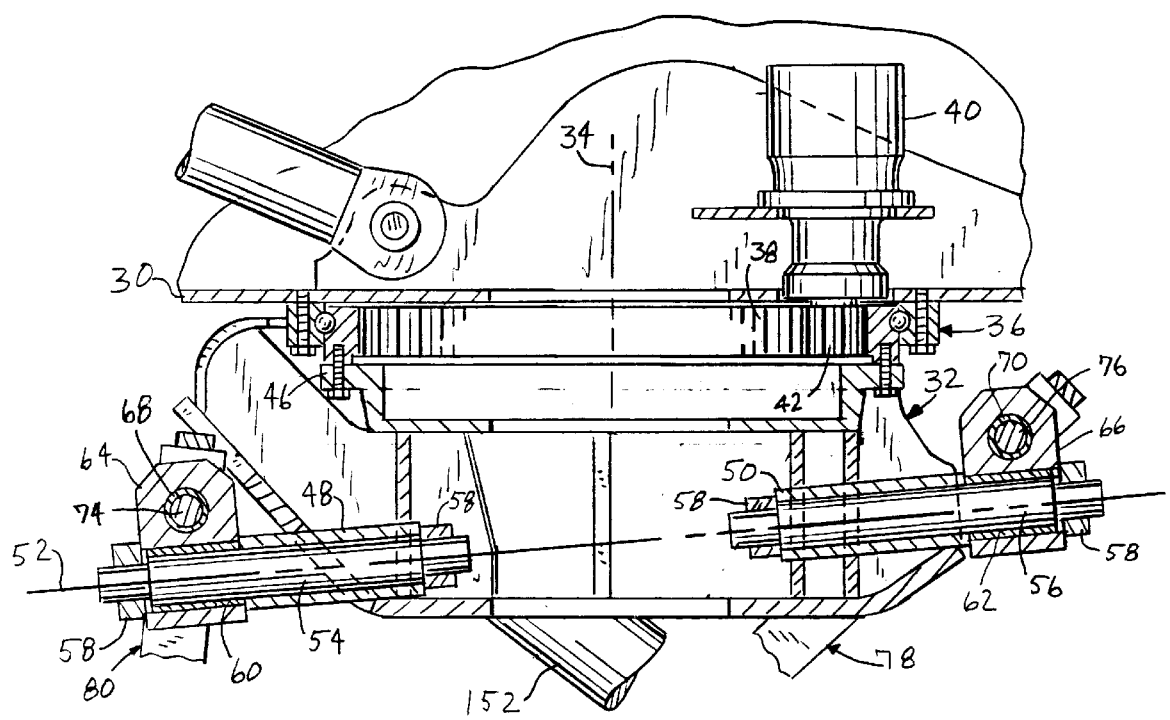
FIG. 11 is a cross-sectional view illustrating the turntable bearing and minor axis pivot joints.

Referring to FIG. 11, the turntable 30 is mounted to a turntable support 32 so as to be rotatable about a turntable major axis 34. A ball bearing connection 36 may be used to provide this rotary connection. Internal gear 38 is fixed relative to the turntable support 32 and a hydraulic motor 40 is fixed to the turntable 30 so as to rotate pinion 42 which meshes with the gear 38. Driving the pinion 42 along the gear 38 serves to rotate the swing-house assembly 14 360° in either direction relative to the turntable support 32. The connection of the turntable to the turntable support and the driving of the turntable about the turntable major axis relative to the turntable support are all conventional, and may be performed in any suitable way to practice the invention.

The turntable support 32 is of formed and welded steel plate construction and includes a flange 46 which is bolted to the inner race of the turntable bearing 36. The turntable support 32 also includes journal shaft supports 48 and 50 which are coaxial along turntable minor axis 52. The turntable minor axis 52 forms an obtuse angle with the turntable major axis 34. Coaxial journal shafts 54 and 56 are inserted through the respective shaft supports 48 and 50 and secured at their inner ends by nuts 58. The journal shafts 54 and 56 extend outwardly from the shaft supports 48 and 50 and through the respective journal bearings 60 and 62 which line the turntable minor axis bores of the respective gimbal mounts 64 and 66. The outer ends of the journal shafts 54 and 56 are each secured by a nut 58. This construction creates a pivot joint between the turntable support 32 and the gimbals 64 and 66 about the turntable minor axis 52.

Figure 6:
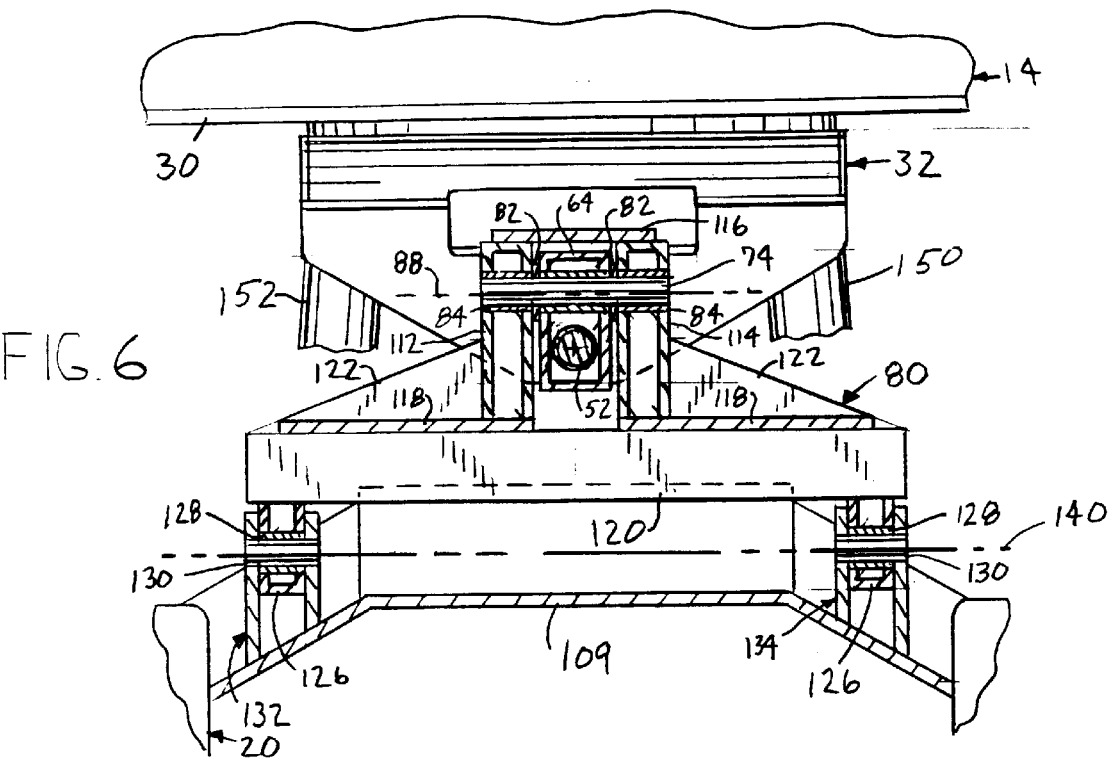
FIG. 6 is a sectional view from the plane of the line 6—6 of FIG. 5A.
Figure 7:
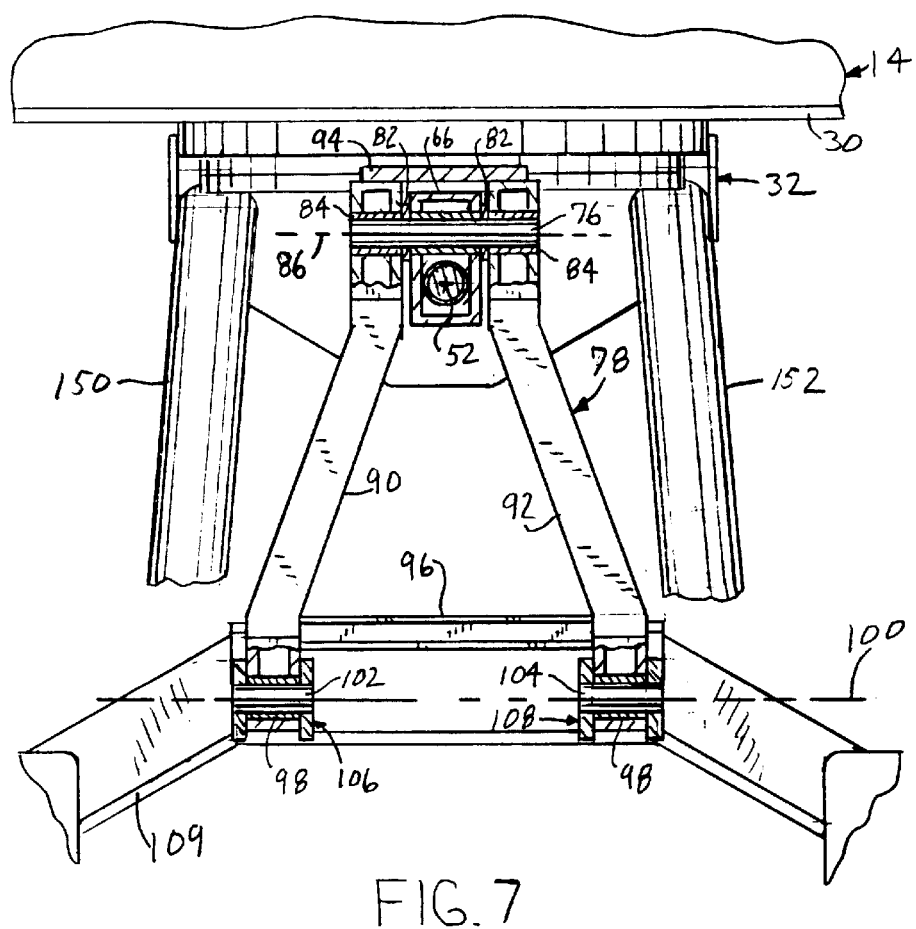
FIG. 7 is a sectional view from the plane of the line 7—7 of FIG. 5A.
Figure 8:
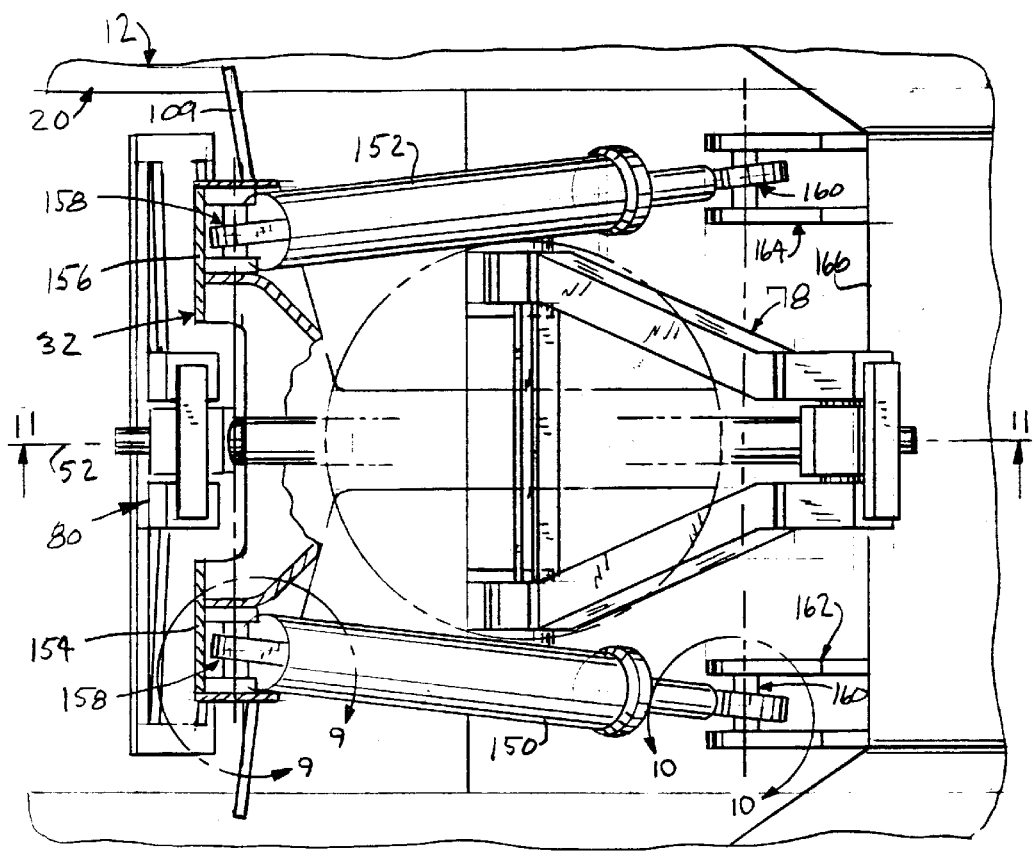
FIG. 8 is a view from the plane of the line 8—8 of FIG. 5A but also illustrating the rear link and illustrating the turntable main or swing bearing raceway in phantom.

Each gimbal 64, 66 also has a lateral bore lined by respective journal bearings 68 and 70 through which extend respective lateral shafts 74 and 76. Both of the shafts 74 and 76 extend beyond the lateral sides of the respective gimbals 64 and 66 and the shaft 76 is supported at its ends by the upper end of a rear link 78 and the shaft 74 is supported at its ends by the upper end of a front link 80. The shafts 74 and 76 are fixed against axial movement by any conventional means such as a spring retaining clip. As illustrated in FIGS. 6 and 7, thrust washers 82 may be provided between the gimbals 64 and 66 and the inside surfaces of the respective links 80 and 78.

The shafts 74 and 76 define respective lateral axes 88 and 86 at the upper ends of the respective links 80 and 78, both of which are positioned above the turntable minor axis 52. Journal bearings 84 may also be provided in the ends of the rear 78 and front 80 links to line the bores of the links that define the respective rear 86 and front 88 upper lateral pivot axes.

Referring to FIG. 7, the rear link 78 includes a pair of arms 90 and 92 of heavy duty tubular or I-beam construction, an upper beam 94 which spans the arms 90 and 92 and is welded to them and a lower beam 96 which also spans the arms 90 and 92 and is welded to them. The link 78 has a lower end defined by the lower ends of arms 90 and 92. The lower end of the link 78 has bores lined by journal bearings 98 in the bores of the arms 90 and 92 which defines a lower lateral pivot axis 100. Shafts 102 and 104 extend through the bearings 98 and at their ends into respective lugs or yokes 106 and 108 which straddle the ends of the arms 90 and 92 and are fixed to the rear of the front bridge 109 of frame 20, for example by welding. The shafts 102 and 104 are fixed axially by any suitable means, such as a spring clip at each end. Thereby, the link 78 can pivot about a lateral axis 100 relative to the frame 20.

Referring to FIG. 6, the forward link 80 is also of welded steel construction. The link 80 includes a pair of tubular or solid steel arms 112 and 114 which are welded together at their upper ends by beam 116 being welded to them and are welded at their lower ends to reinforcing spacer plates 118 (which could be a single plate) which are welded on top of box beam 120. Forward and rearward gusset plates 122 are also welded to the arms 112 and 114 and to the adjacent plate 118. At the ends of the beam 120, extensions 126 are welded on which have lateral bores lined by journal bearings 128. Shafts 130 extend through the journal bearings 128 and are axially fixed by any suitable means (e.g. spring clips) relative to yokes 132 and 134 which straddle the extensions 126 and are fixed, for example by welding, to the front bridge 109 of frame 20, on the front side of the bridge 109. Thereby, a lower lateral pivot joint is made between the front link 80 and the frame 20 so as to pivot about lower lateral pivot axis 140, which is longitudinally closer to the lower axis 100 of the rear link 78 than the front upper axis 88 is to the rear upper axis 86.

Figure 2:
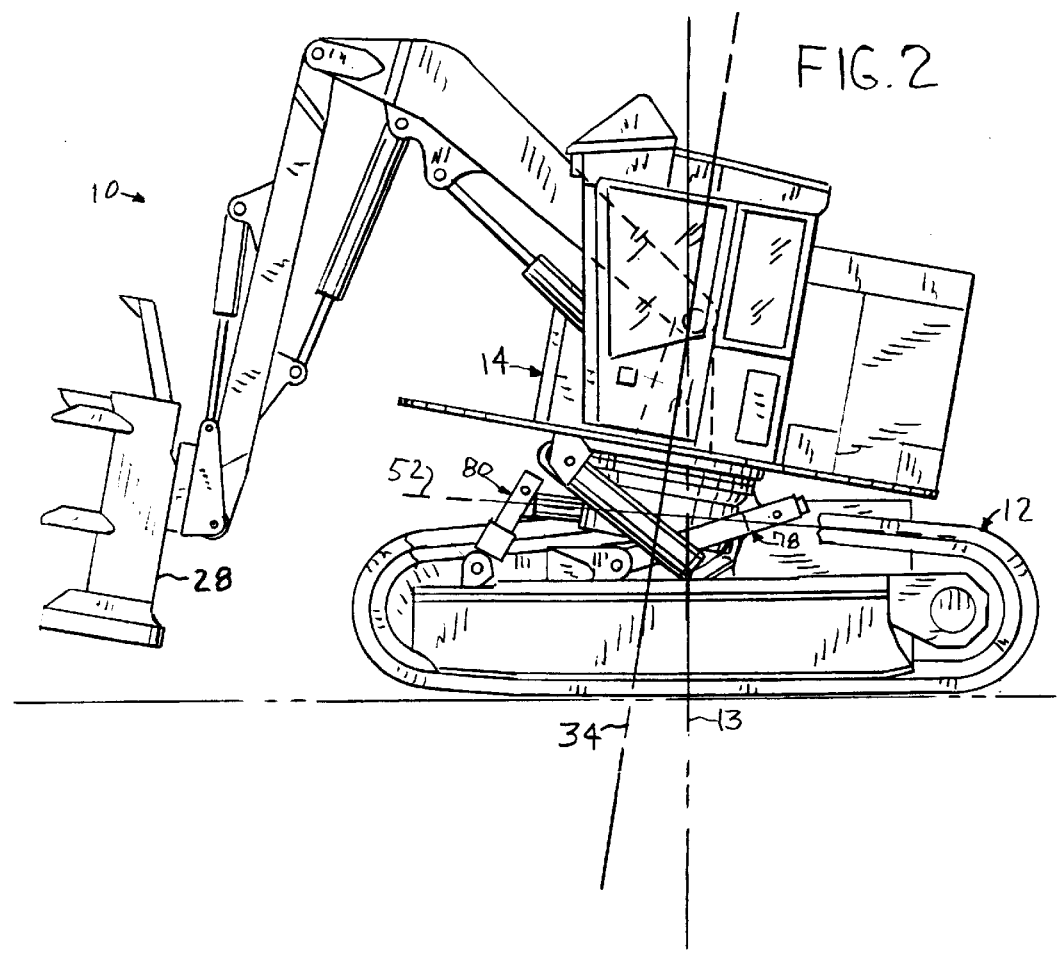
FIG. 2 is a side elevation view of the feller buncher with the swing-house assembly tilted rearwardly.
Figure 9:
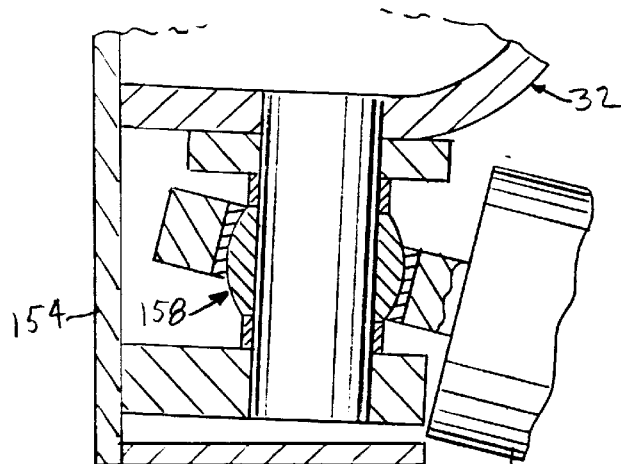
FIG. 9 is a cross-sectional view illustrating the upper ball joint of the hydraulic cylinders.
Figure 10:
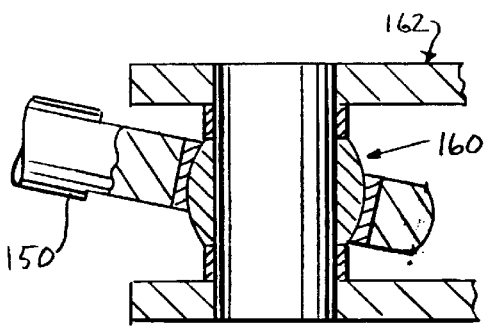
FIG. 10 is a detail sectional view illustrating the lower ball joint of the hydraulic cylinders.

A pair of laterally spaced hydraulic cylinders 150 and 152 are provided to apply forces to the turntable support 32 so as to reposition and reorient it forwardly and rearwardly relative to the carriage 12, and also to rotate the turntable support 32 about the turntable minor axis 52. The upper ends of the cylinders 150 and 152 are connected by conventional ball joints 158 as illustrated in FIG. 9 to respective extensions 154 and 156 of the turntable support 32 along an upper lateral cylinder pivot axis. The ball joints 158 permit lateral (side to side) and longitudinal (fore and aft) pivoting between the upper ends of the cylinders 150 and 152 and the extensions 154, 156. This permits the turntable support 32 to be rotated about the turntable minor axis 52 by pressurizing the cylinders 150 and 152 so as to change their length relative to one another as illustrated in FIG. 3. When the cylinders 150 and 152 are extended or retracted in unison, the turntable support 32 is rotated about a lateral (side-to-side) axis either forwardly as illustrated in FIGS. 1A and 1B, or rearwardly as illustrated in FIG. 2.

The lower ends of the cylinder 150, 152 rods are pivotally connected with ball joints 160 to yokes 162 and 164 along a lower lateral cylinder pivot axis, which yokes are welded to the rear bridge 166 of the frame 20. It is important that the cylinders 150 and 152 be laterally spaced apart so as to gain leverage to impart the forces necessary to pivot the turntable support 32 about the minor axis 52. In addition, the cylinders 150, 152 must be far enough apart so that the rear link 78 will fit between them, in as much as the top ends of the cylinders 150 and 152 are forward of the rear link 78 and the lower ends of the cylinders 150 and 152 are rearward of the link 78, so that the cylinders 150 and 152 cross the link 78 diagonally.

Referring to FIG. 1A, the carriage 12 defines an axis 13 which is perpendicular to the plane defined by the ground engaging surfaces of the carriage 12 and intersects the center of the carriage 12. The lower ends of both of the links 78 and 80, which are pivotally connected to the frame 20, are not equidistant from the center axis 13 of the carriage 12, or from the ends of the carriage 12. Both lower ends of the links 78 and 80 are positioned on one longitudinal side of the carriage axis 13. In particular, they are both positioned in front of the carriage axis 13. The cylinders 150 and 152 are pivotally connected to the turntable support 32 at a longitudinal position which is between the upper ends of the links 78 and 80, and the cylinders 150 and 152 extend rearwardly to a position rearward of the lower ends of the rear link 78. The lower pivot points of the links 78 and 80 and of the cylinders 150 and 152 are above the axes of the sprockets and idler wheels of the carriage 12. Thus, the lower pivot points do not limit the ground clearance of the machine 10.

The distance between the upper and lower lateral pivot axes 88 and 140 for the front link 80 is substantially less than the distance between the upper and lower lateral pivot axes 86 and 100 for the rear link 78. Thus, when the cylinders 150 and 152 are simultaneously extended or retracted, the front of the turntable support 32 follows a path, centered on the lower pivot axis 140 of the front link 80, which is of a substantially smaller radius than the path followed by the rear of the turntable support 32 which is centered on the lower pivot axis 100. The result is that for a given simultaneous extension or retraction of the cylinders 150 and 152, the rear of the turntable support 32 traverses a larger vertical distance than the front of the turntable support 32 does. Thus, a larger proportion of the rotation of the support 32, and therefore of the swing-house assembly 14, about a lateral axis is provided by vertical movement of the rear of the support 32.

This construction enables a favorable positioning of the swing-house assembly 14, significantly nearer to the front, uphill end of the carriage 12 than to the rear, downhill end, when making a downhill cut as illustrated by FIG. 1B. Thereby, end over end rolling of the machine downhill is resisted.

Figure 5C:
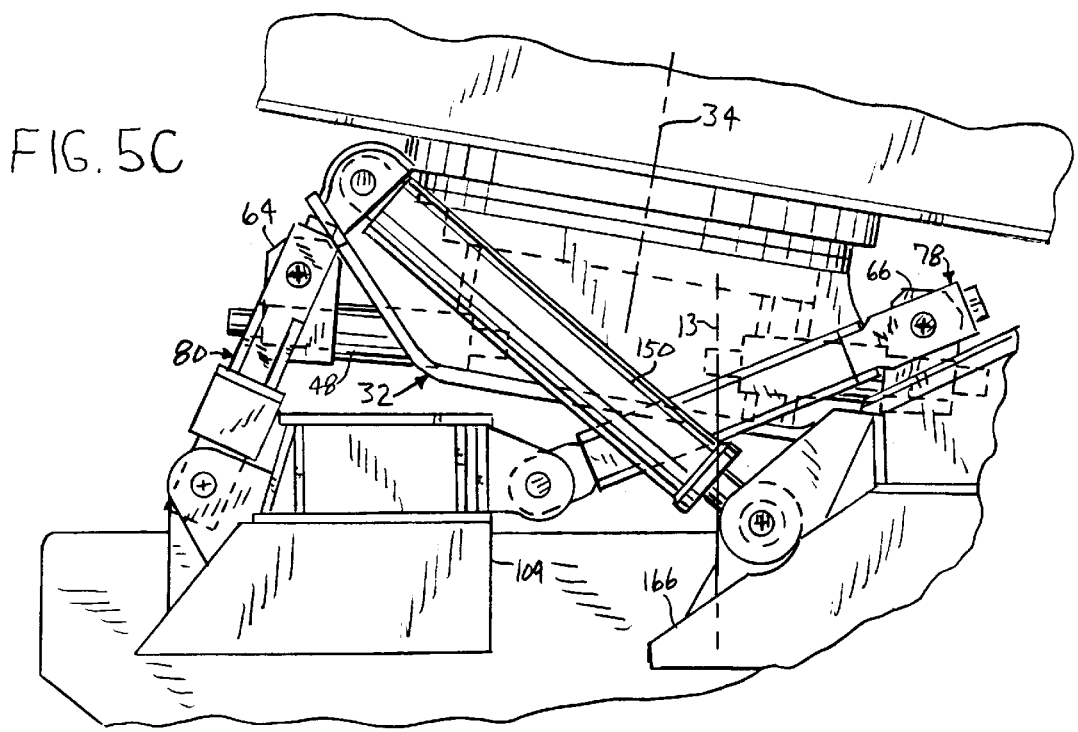
FIG. 5C is a view similar to FIG. 5A but with the turntable pivoted rearwardly from the position of FIG. 5A.
Figure 5A:
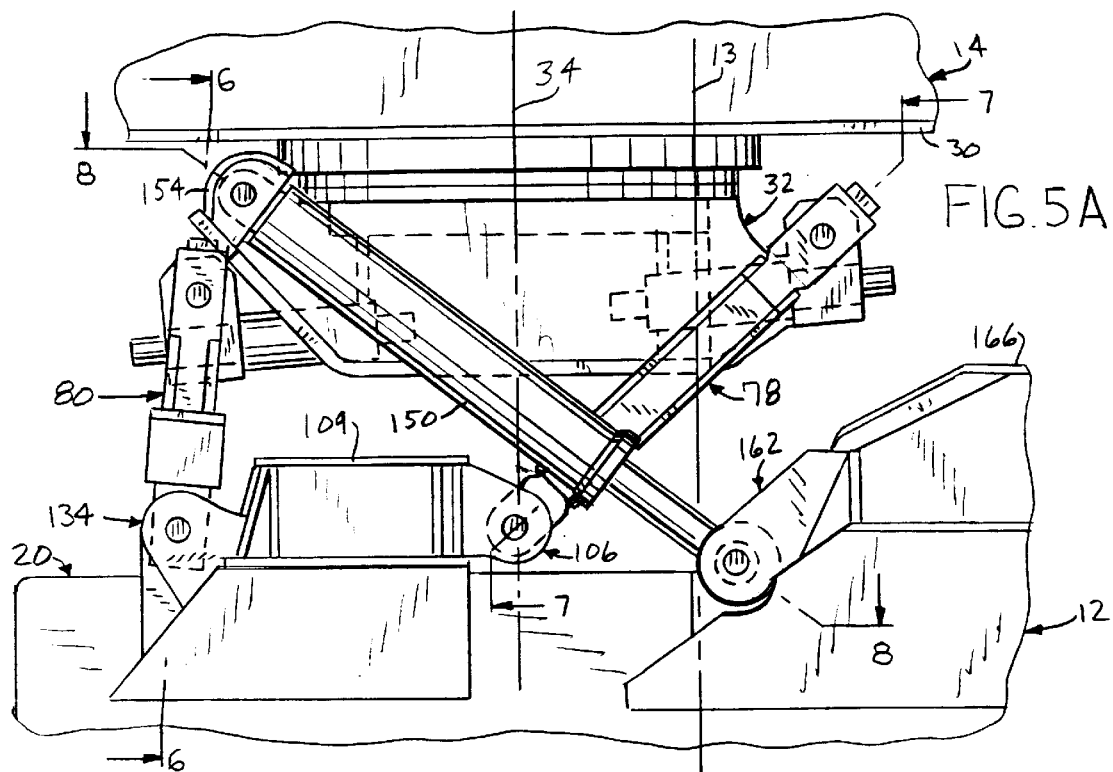
FIG. 5A is a fragmentary elevation view of the leveling mechanism drawn with the turntable major axis parallel to the carriage axis.
Figure 5B:
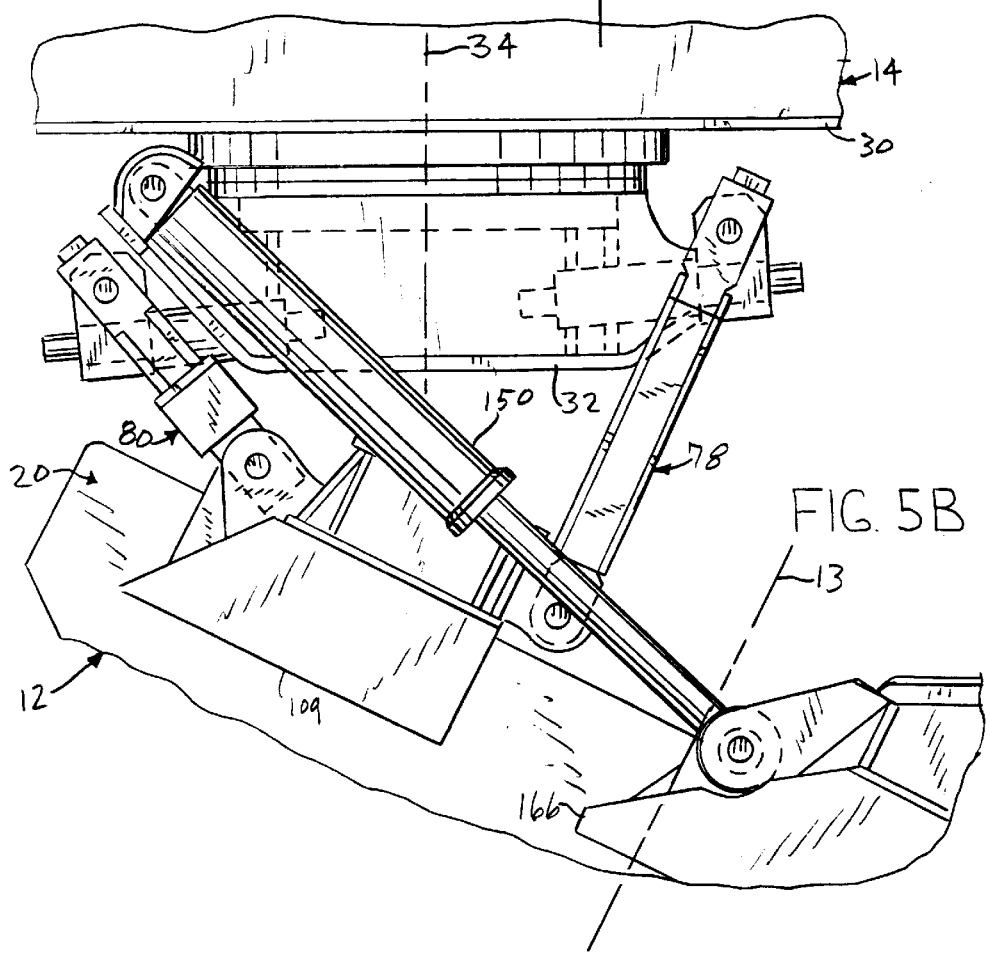
FIG. 5B is similar to FIG. 5A but with the turntable pivoted forwardly from the position shown in FIG. 5A.

In addition, this construction permits tilting the turntable support 32, and therefore the swing-house assembly 14, rearwardly about a lateral axis, in the preferred embodiment by as much as 10 degrees, as illustrated in FIGS. 2 and 5C. This reduces the height of the machine from the parallel position (FIG. 5A) to reach the position in which the overall height of the machine, typically the height as measured from the bottom of the tracks to the top of the cab, is minimized. This is important because for over the road transport of the machine on a flatbed trailer, the height of the machine must be within the legal limit. In addition, this permits leveling by tipping the swing-house assembly rearwardly when cutting on a downhill slope.

A preferred embodiment of the invention has been described in considerable detail. Many modifications and variations to the preferred embodiment described will be apparent to those skilled in the art. For example, the links 78 and 80 need not be made as unitary weldments, but each could be made in two or more pieces. Therefore, the invention should not be limited to the embodiment described, but should be defined by the claims which follow.

What is claimed is:

1. In a leveling mechanism for a feller buncher for mounting a boom swing-house assembly to a ground engaging carriage, said carriage having a frame and said boom swing-house being supported on a turntable support, said leveling mechanism having a front link, a rear link and a mechanism which repositions said turntable support relative to said carriage, each said link having one or more lower ends pivotally connected to said frame of said carriage to pivot about a lower lateral pivot axis and one or more upper ends pivotally connected to said turntable support to pivot about an upper lateral pivot axis, the improvement wherein the distance between the upper and lower lateral pivot axes of one of said links is shorter than the distance between the upper and lower lateral pivot axes of the other of said links.

2. The improvement of claim 1, wherein said lower lateral pivot axes of both of said links are positioned on one longitudinal side of a longitudinal center of said carriage.

3. The improvement of claim 1, wherein said repositioning mechanism comprises a hydraulic cylinder having an upper end pivotally connected to said turntable support at a longitudinal position which is on one longitudinal side of the upper lateral pivot axis of one of said links and having a lower end pivotally connected to said frame at a longitudinal position which is on an opposite lateral side of the lower lateral pivot axis of said one link.

4. The improvement of claim 3, wherein said cylinder is one of two cylinders, which are laterally spaced apart and have upper ends that connect to said turntable support along an upper lateral cylinder pivot axis and lower ends which pivotally connect to said frame along a lower lateral cylinder pivot axis, and wherein said upper ends of said links are pivotally connected to said turntable support by a connection which permits said turntable support to pivot relative to said upper ends of said links about a turntable minor axis, and wherein said upper ends of said cylinders are spaced laterally along said upper lateral cylinder pivot axis on opposite sides of said turntable minor axis so as to pivot said turntable support about said minor axis with differential extensions of said cylinders.

5. The improvement of claim 4, wherein said swing-house assembly can pivot relative to said turntable support about a turntable major axis, and said turntable minor axis forms an obtuse angle with said turntable major axis.

6. The improvement of claim 1, wherein said lower lateral pivot axes of said links are longitudinally fixed in position relative to said frame of said carriage.

7. The improvement of claim 1, wherein said repositioning mechanism comprises a pair of laterally spaced apart hydraulic cylinders having upper ends pivotally connected to said turntable support and lower ends pivotally connected to said frame such that extension and retraction of said cylinders causes fore and aft tilting of said turntable support relative to said carriage.

8. The improvement of claim 7, wherein said turntable support is tiltable from side to side relative to said carriage and said cylinders are operable to tilt said turntable support from side to side with differential extension or retraction of said cylinders.

9. The improvement of claim 1, wherein said turntable support can be tilted fore and aft relative to a position in which a major axis of said turntable support is parallel to a center axis of said carriage.

10. The improvement of claim 9, wherein said turntable support can be tilted further in one longitudinal direction than the other from said parallel position.

11. The improvement of claim 1, wherein the lower lateral pivot axis of the link which has the shorter distance between its upper and lower lateral pivot axes is positioned closer to one end of said carriage than said lower lateral pivot axis of the other link is positioned to an opposite end of said carriage.

12. The improvement of claim 11, wherein said lower lateral pivot axes of said links are closer together longitudinally than said upper lateral pivot axes of said links.

* * * * *